(12) United States Patent
Steane

(10) Patent No.: US 6,200,140 B1
(45) Date of Patent: Mar. 13, 2001

(54) DOUBLE-BEAM MATH BALANCE

(76) Inventor: Douglas Allan Steane, PO Box 1034, Elora, ON (CA), N0B 1S0

(*) Notice: Subject to any disclaimer, the term of this patent is extended or adjusted under 35 U.S.C. 154(b) by 0 days.

(21) Appl. No.: 09/367,189

(22) PCT Filed: Feb. 11, 1998

(86) PCT No.: PCT/CA98/00072

§ 371 Date: Aug. 3, 1999

§ 102(e) Date: Aug. 3, 1999

(87) PCT Pub. No.: WO98/36402

PCT Pub. Date: Aug. 20, 1998

(30) Foreign Application Priority Data

Feb. 12, 1997 (CA) .................................... 9702868

(51) Int. Cl.⁷ .................................................. G09B 1/00
(52) U.S. Cl. ........................................ 434/194; 434/188
(58) Field of Search ................................. 434/188, 190, 434/191, 194, 195, 209; 177/184, 210 EM

(56) References Cited

U.S. PATENT DOCUMENTS

| 784,145 | * | 3/1905 | Donecker | 434/194 |
|---|---|---|---|---|
| 3,000,114 | * | 9/1961 | Orlov | 434/194 |
| 3,567,221 | * | 3/1971 | Stults | 434/194 |
| 3,949,491 | * | 4/1976 | Harte | 434/194 |
| 3,955,638 | * | 5/1976 | Wasko | 177/212 |
| 3,987,861 | * | 10/1976 | Smith | 177/184 |
| 4,106,220 | * | 8/1978 | Hurd | 434/194 |
| 4,184,556 | * | 1/1980 | Kunz | 177/210 |
| 4,389,049 | * | 6/1983 | Wiley | 273/153 R |
| 4,871,314 | * | 10/1989 | Shih | 434/194 |
| 5,425,643 | * | 6/1995 | Strickland | 434/194 |
| 5,672,136 | * | 9/1997 | Hunt | 475/255 |

FOREIGN PATENT DOCUMENTS

240574 * 10/1987 (EP) ..................................... 434/194

* cited by examiner

Primary Examiner—Jacob K. Ackun
Assistant Examiner—Kent Fernstrom
(74) Attorney, Agent, or Firm—Anthony Asquith & Co.

(57) ABSTRACT

The teaching aid apparatus provides two balance beams (27, 28), one above the other, on a support post (23). Weight-attachment stations (36) are provided on the left and right arms of both beams, and the stations are marked on the beams with numerals indicative of distance of the station from the beam fulcrum. The beams are connected by means of pinions (32, 34), which constrain the beams to tip in unison in response to unbalance of one beam. The apparatus aids the demonstration of negative concepts to young children.

19 Claims, 9 Drawing Sheets

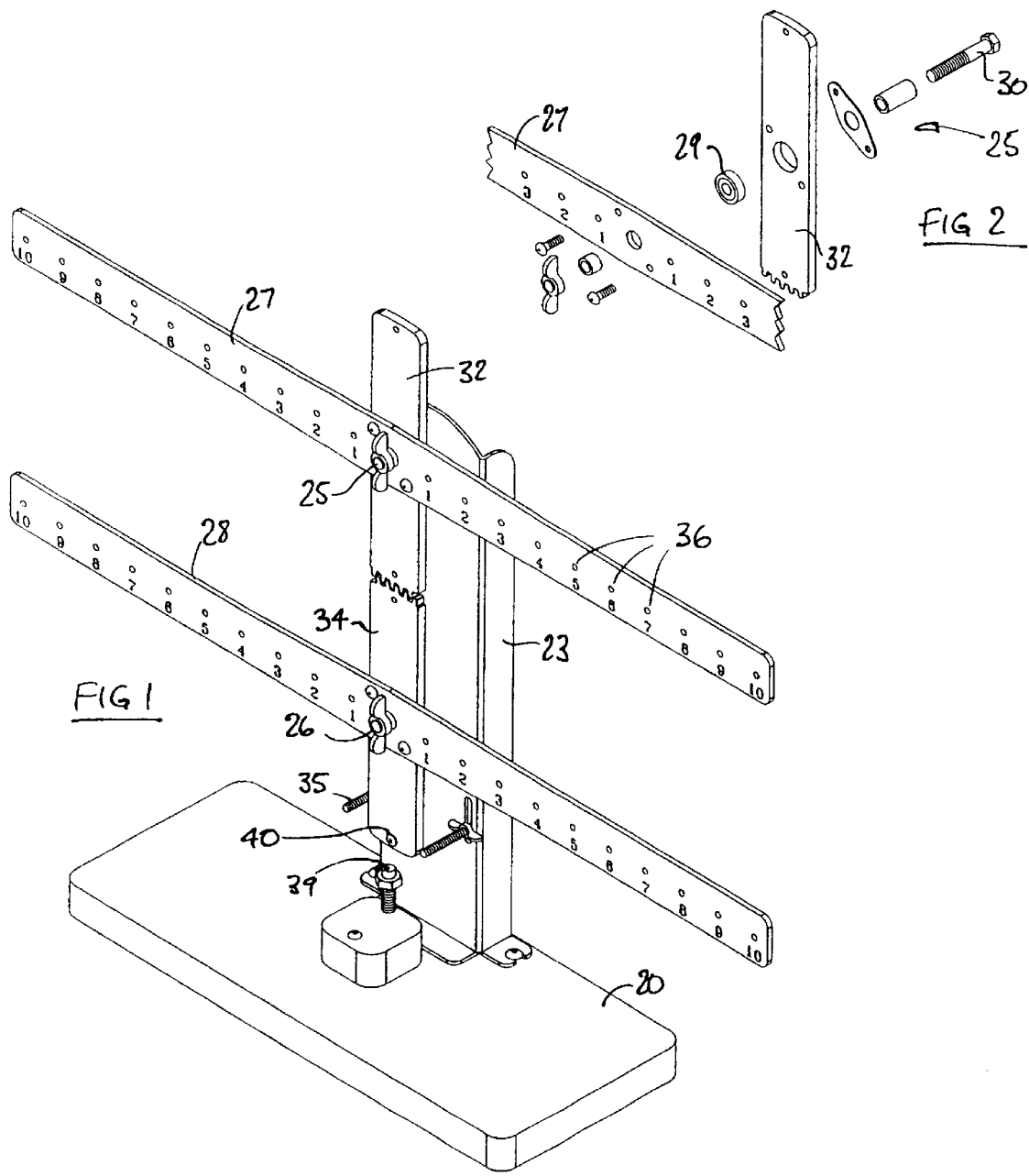

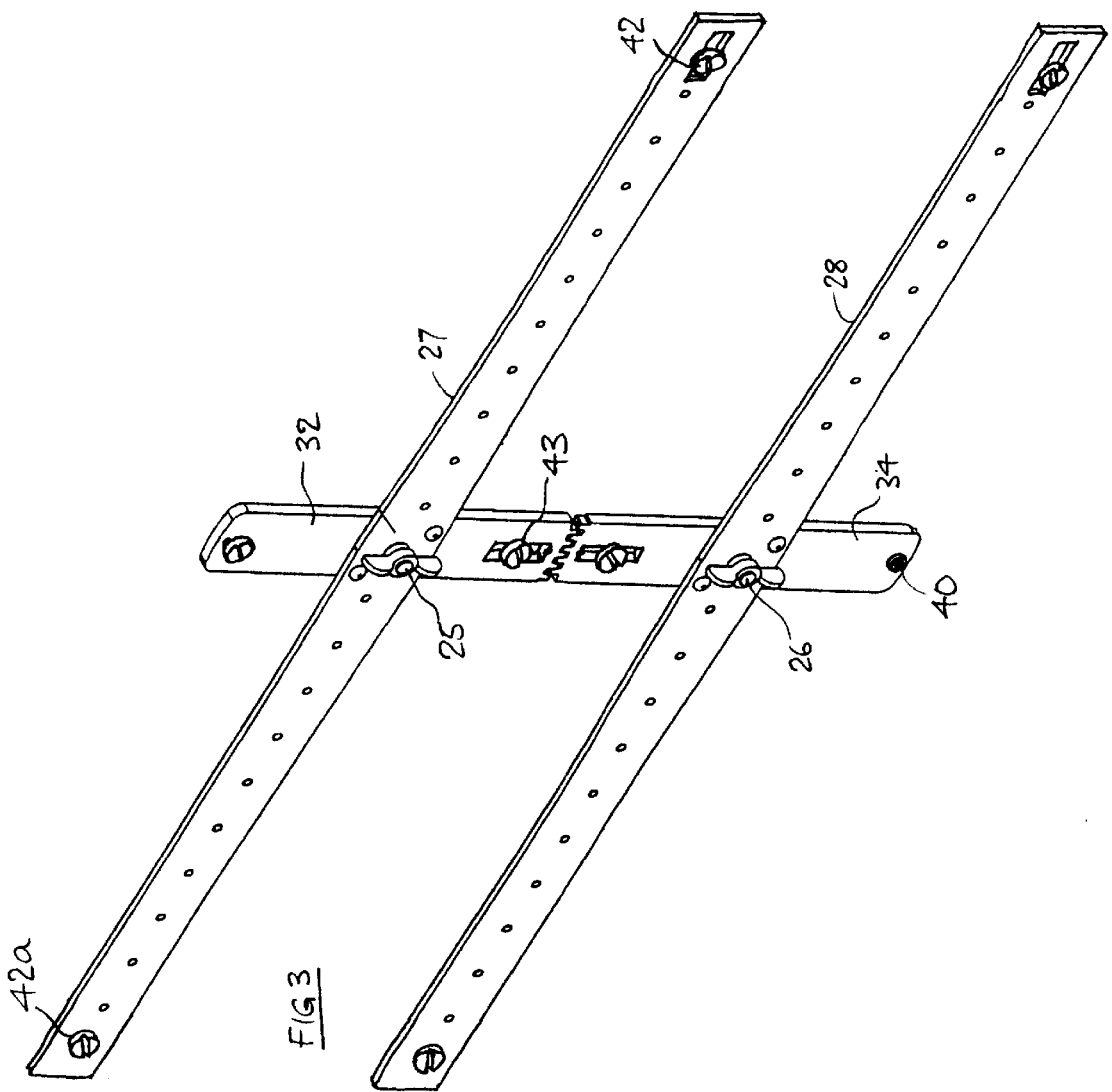

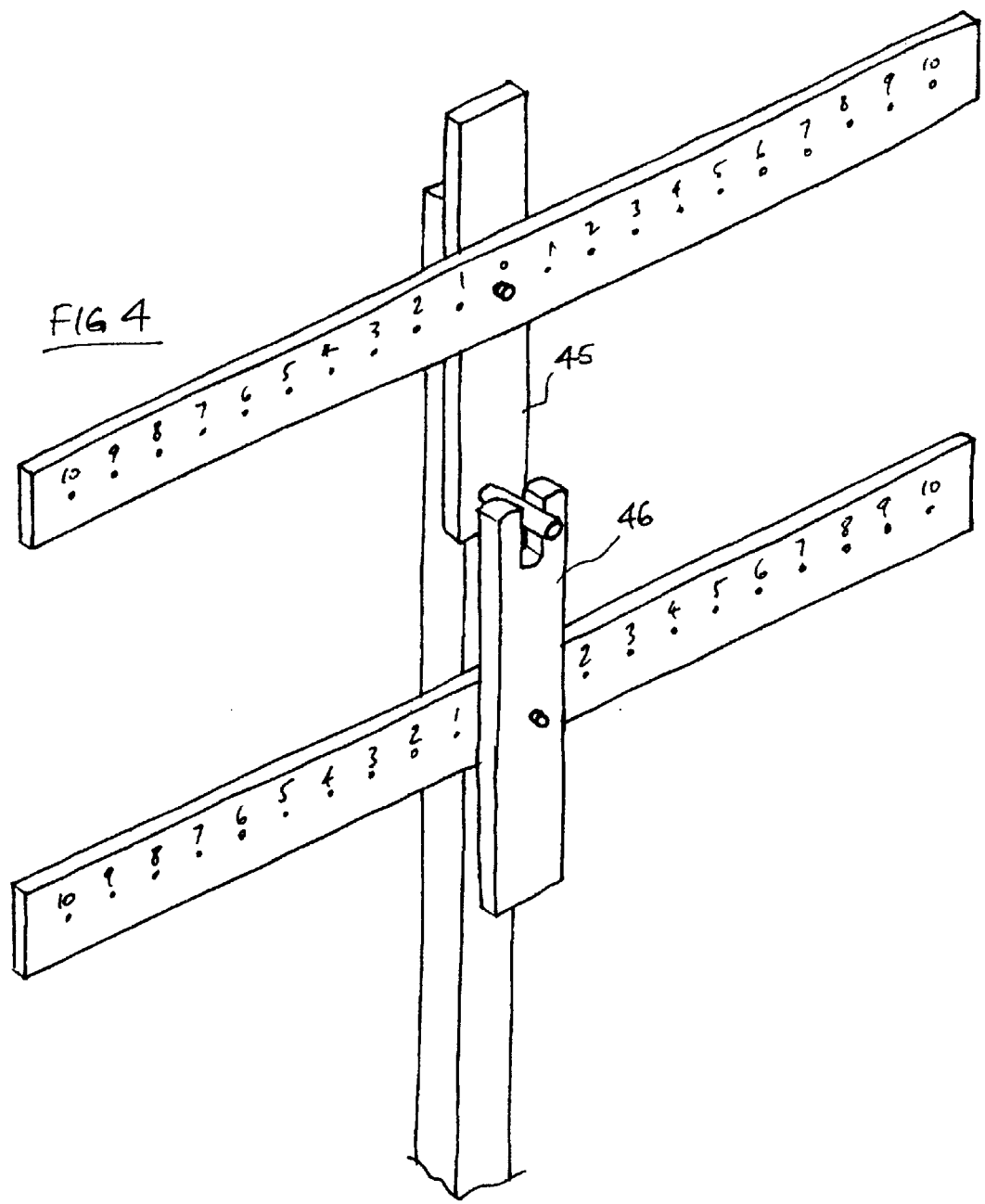

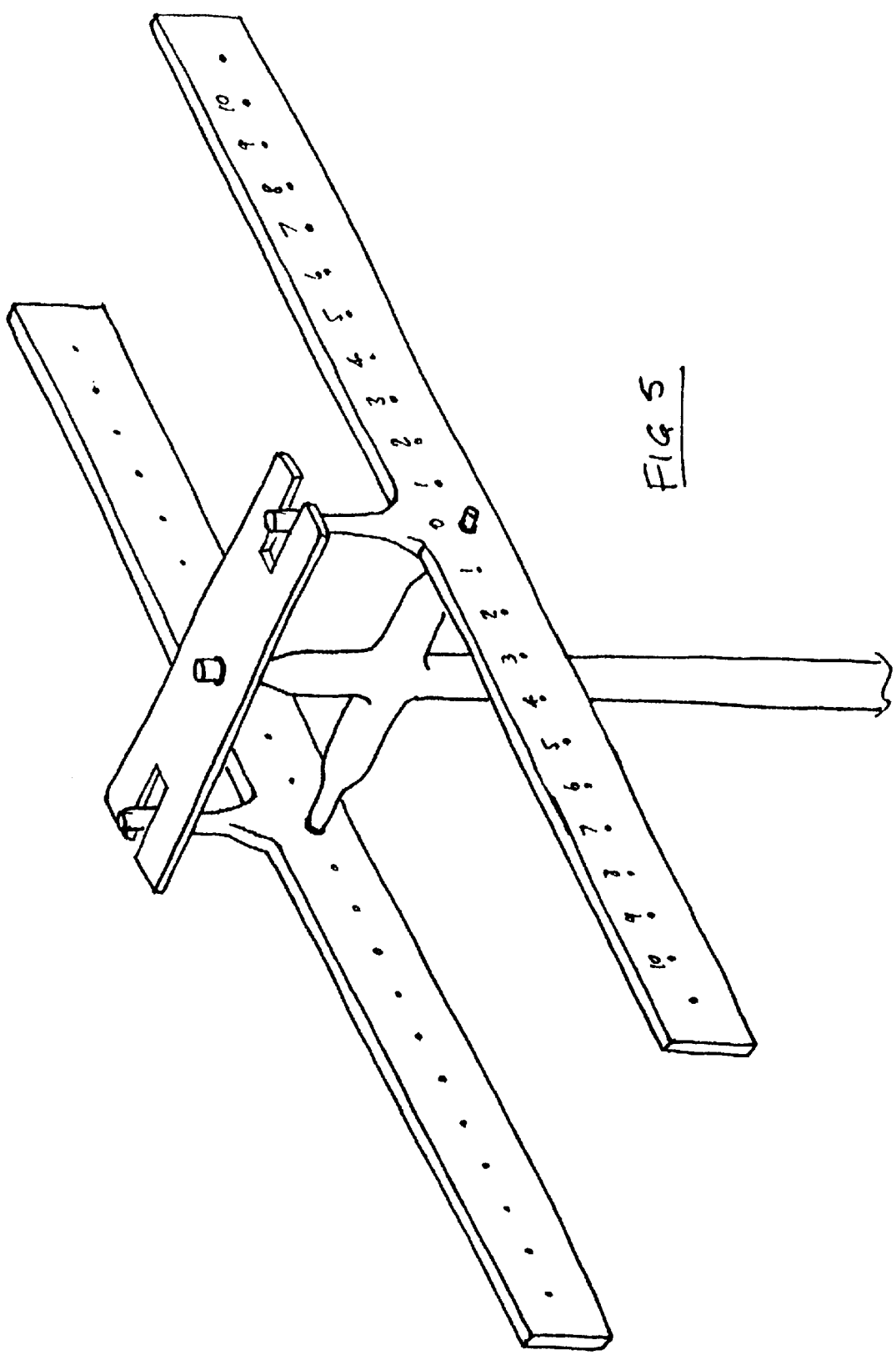

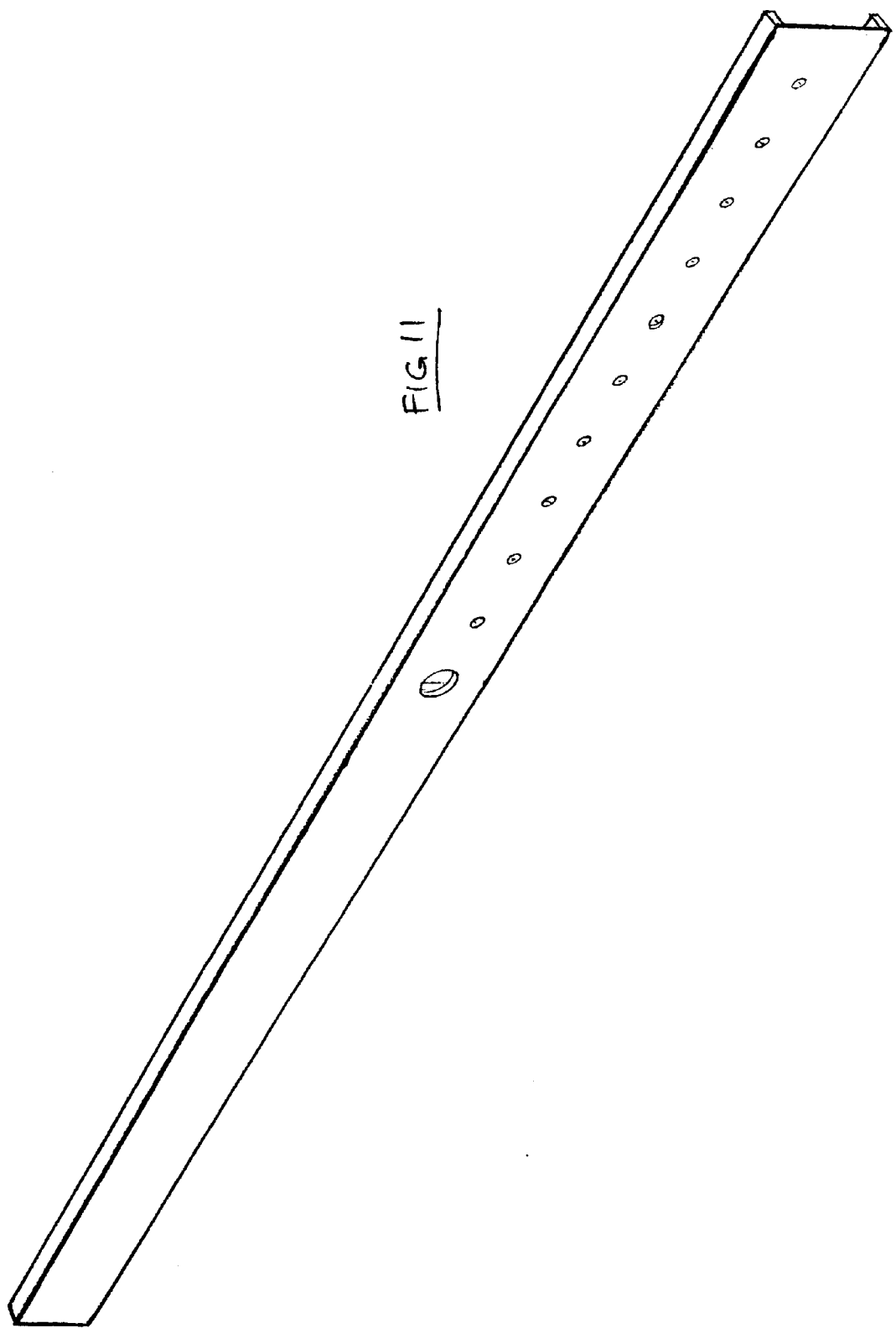

DOUBLE-BEAM MATH BALANCE

BACKGROUND OF THE INVENTION

This invention relates to educational aids.

The invention may be regarded as a development of the conventional math-beam or math-balance. In a math-balance, a horizontal beam is provided, having weight stations, at which weights can be attached. Various mathematical relationships can be demonstrated to children, who discover how the weights can be manipulated to balance the beam.

The invention also has links to the technology disclosed in patent publication WO-95/32778 (Steane, Dec 7, 1995).

One of the problems with a conventional math balance is that the balance cannot represent negative numbers. Of course, the notion of subtraction of a small positive number from a larger positive number can be demonstrated on the conventional balance; but the different concept of the negative numbers as a series of numbers extending away from zero in the parallel but opposite sense to positive numbers, is traditionally much harder to teach, and the traditional math balance provides no assistance.

SUMMARY OF THE INVENTION

The present invention basically involves providing two balance-beams, and a means for constraining the two beams to interact. As will be explained, the two beams are arranged one to represent positive numbers, and the other to represent negative numbers. The in-balance condition of the beams serves to indicate equality, as in a conventional math-balance.

BRIEF DESCRIPTION OF THE DRAWINGS

The invention will now be further described by referring to specific embodiments of the invention, as shown in the accompanying drawings, in which:

FIG. 1 is a pictorial view of the double-beam math balance apparatus that embodies the invention;

FIG. 2 is an exploded view of some of the components of the apparatus of FIG. 1;

FIG. 3 is a close-up of some of the components of a modified version of the apparatus of FIG. 1;

FIG. 5 is another alternative version;

FIGS. 9,10,11 show components of other apparatuses that embody the invention

DETAILED DESCRIPTION OF THE INVENTION

Figure 6:
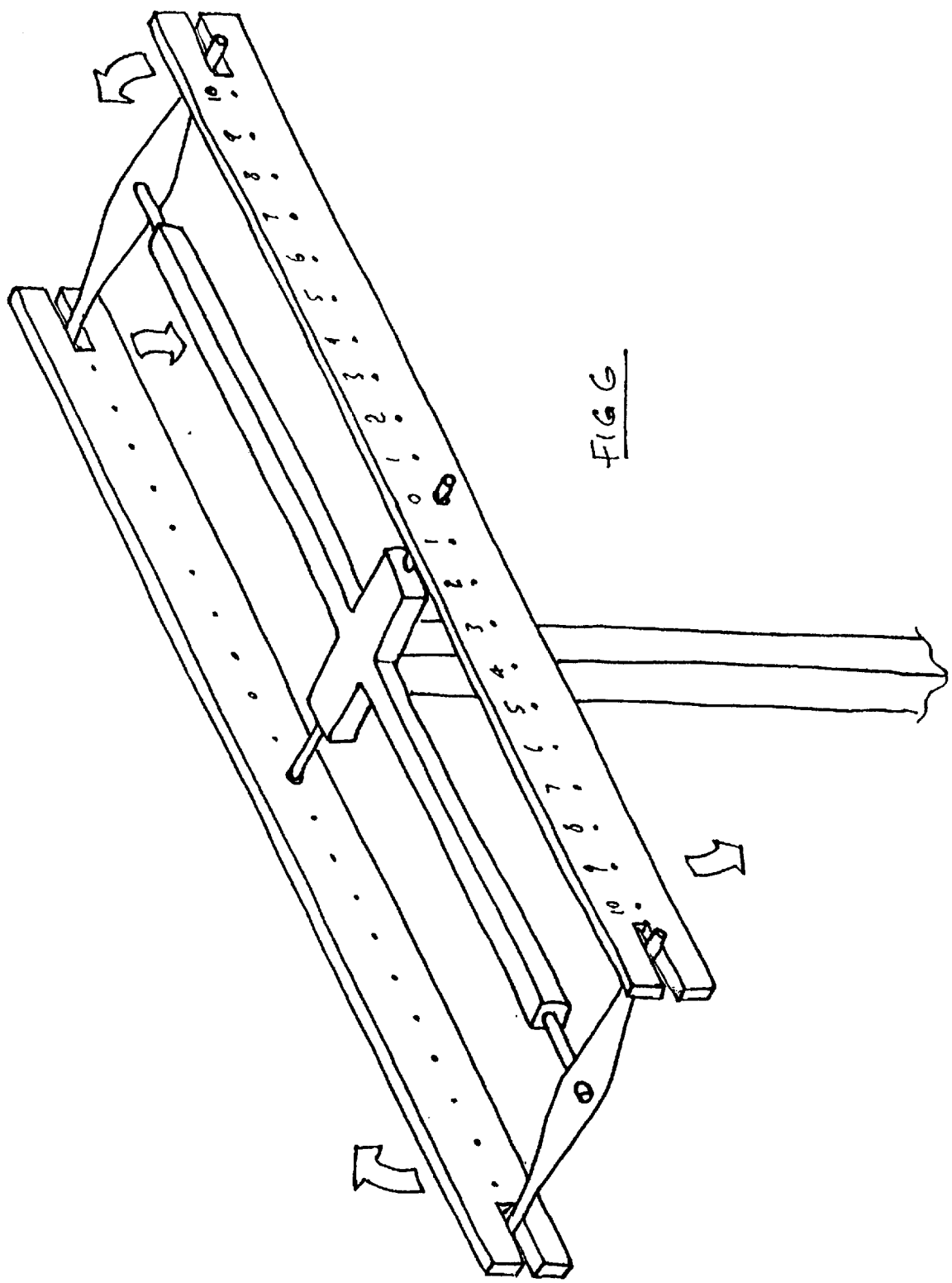
FIG. 6 is another alternative version.

The structures as depicted herein are examples of structures that embody the invention. It should be noted that the scope of the invention is defined by the accompanying claims, not by particular features of specific embodiments.

The apparatus shown in FIG. 1 comprises a base 20, and an upright post 23. Upper and lower pivots or fulcrums 25,26 are secured to the post 23, at the different heights as shown. Upper and lower balance beams 27,28 are secured to the fulcrums.

The arrangement of one of the fulcrums or pivots 25 is shown in FIG 2. An anti-friction bearing 29 ensures that the beam 27 swings very freely, and yet precisely, with respect to the pivot pin 30. The pivot pin is fixed to the post 23.

The beams 27,28 carry respective upper and lower pinions 32,34, which are fixed fast to the beams. The pinions have teeth, and are so mounted that the teeth are in mesh. Thus, as the upper beam pivots clockwise, the lower beam is constrained to pivot anti-clockwise. The amplitudes of the angular movements of the upper and lower beams are constrained to be equal. Stops 35 prevent the lower pinion 34 (and thus prevents the two beams) from tipping too far.

In operation, the upper beam is used for positive numbers, and the lower beam is used for negative numbers, but these roles of the beams can be reversed.

The beams are provided with weight stations 36, at which weights can be attached to the beams. The weight stations are marked with numerals, the numerals being proportional to the distance the station is from the fulcrum.

To illustrate the arithmetical relationship 4+3−5 (for example), weights would be placed at the weight-stations located at positions 4 and 3 on the left arm of the upper beam 27, and at position 5 on the left arm of the lower beam 28. Such a placement could be balanced by placing a weight at station 2 on the right arm of the upper beam 27.

Of course, placing the weight at station 5 on the left arm of the lower beam 28 has exactly the same effect, as far as balancing the beam is concerned, as placing a weight at station 5 on the right arm of the upper beam 27. So the extra beam does not affect what is needed to balance the beam. The purpose of providing the additional beam is to give children a vehicle for enabling them to make a concrete visualization of the fact that negative numbers exist as a series of numbers in their own right, i.e a series that parallels the series of positive numbers. One of the difficulties mathematics teachers face lies in getting children to visualize the difference between negative numbers as a separate series, as distinct from simply being positive numbers that happen to be participating in a subtraction operation.

It may be regarded that the difference between adding weights to the lower right arm and adding weights to the upper left arm is the difference between adding a negative number and subtracting a positive number. The effect is the same, but the allimportant visualization is different.

Figure 7:
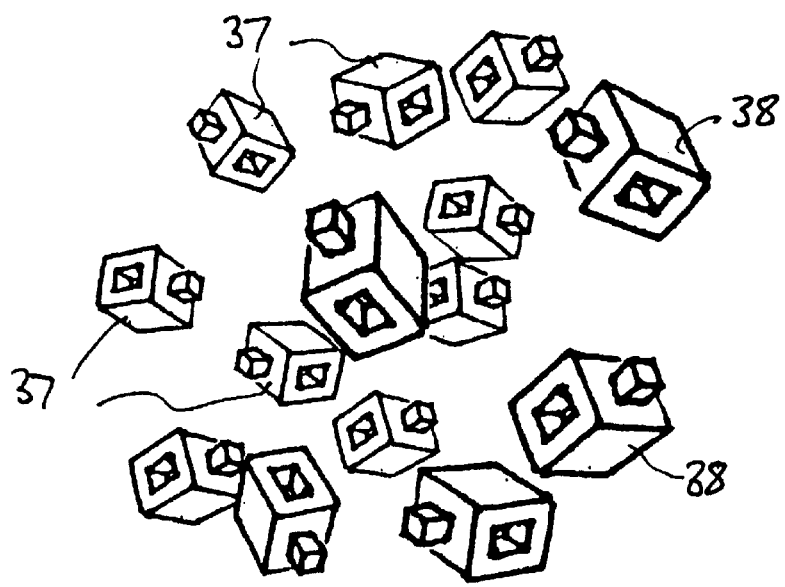
FIG. 7 shows sets of weights, for use with the double-beam math-balance apparatus.

The weights used in conjunction with the apparatus are shown in FIG. 7. The set of weights comprises many one-unit weights 37, and a number of weights 38 that are integer-multiples of the one-unit weight. The one-unit weights 37 can be the common one-gram-one-centimeter cubes, which are found in most classrooms.

Proprietary versions of these weights 37,38 usually have a peg and socket arrangement whereby they can be attached to each other. In that case, the weight stations 36 are provided as holes in the beams, into which the pegs on the weights can be inserted.

Alternatively, or in addition, pans (not shown) may be provided, which can be suspended from the weight stations 36, and the weights 37,38 placed in the pans.

The fact that the weights 38 exist as a series of increasing integers of weight enables a further dimension of the apparatus, by enabling the apparatus to include multiplication factors. Thus, placing a 3-gm weight at station upper-4-left, and a 5-gm weight at station lower-6-left, enables the left side of the balance to be visualized as (3*4)−(5*6). As will be understood, the resultant left side of this "equation" is a negative number (i.e −18). This can be balanced by placing weights (either 1-gm weights, multi-gram weights, or combinations thereof) at suitable weight stations on the negative beam on the right side of the equation—that is to say, on the right arm of the lower beam 28—for example by placing a 3-gm weight at station lower-6-right.

Of course, manipulating multi-unit weights to give an extra dimension to the balance beam is present in the conventional single-beam math balance. However, it has long been known that the single-beam math balance is rather unsatisfactory from the standpoint of holding the child's interest, and of leading the child into further exploration. Variations on the math-balance theme have been proposed. However, the previous proposals have been too complicated, especially for small children. With the double-beam balance, as described herein, children are provided with what turns out to be just the right degree of difficulty and challenge. Given that the single-beam balance is a little too simple to hold interest, the double-beam balance is just right.

The double-beam balance is not so complex, as a functioning structure in itself, that its operational complexity might constitute a barrier to the visualisation of the number concepts (as some prior art variations of math-balances have been). The double-beam balance can be used to lead children to the different concepts progressively. To aid in this progressiveness, preferably children should have gained some familiarity with the conventional single-beam balance before progressing to the double-beam balance.

Figure 8:
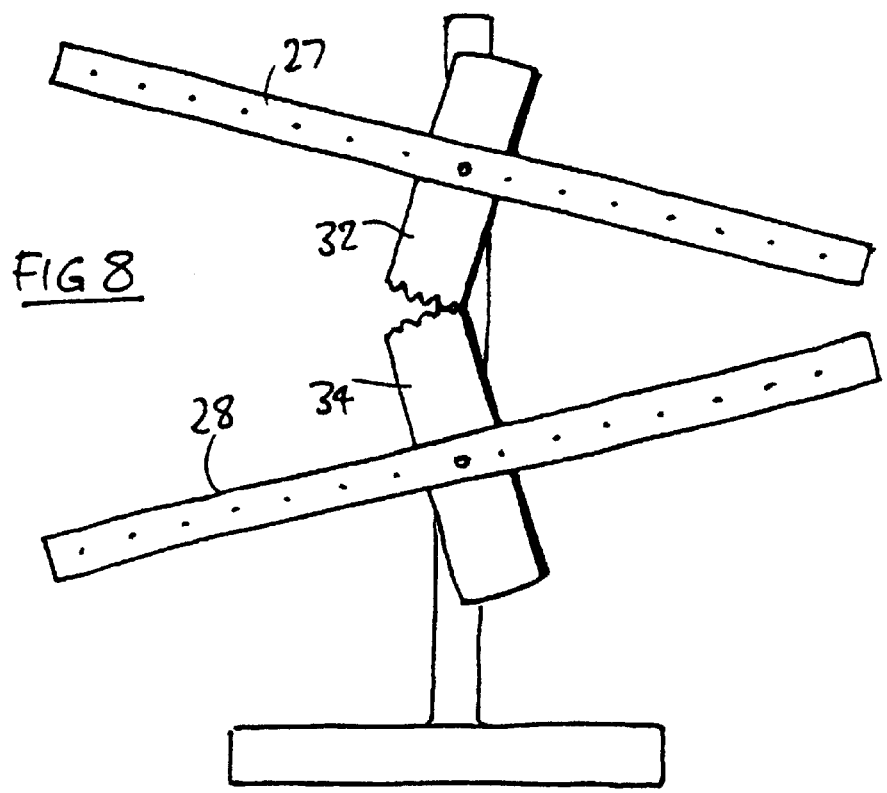
FIG. 8 depicts the apparatus of FIG. 1 in an unbalanced condition.

It is mainly intended, in the use of the apparatus, that the weights be placed on the beams in such a manner as to cause balance. However, incidentally, the apparatus as illustrated in FIG. 1 has another educationally beneficial function. The convention, as used in arithmetic, concerning the inequality arrow signs: ">" and "<", is that the open side of the arrow points to the larger number, and the pointed side of the arrow points to the smaller number. As shown in FIG. 8, this convention is actually made visible in the disposition of the pinions 32,34 comprising vertical bars when the beams 27,28 are not balanced.

This visible presentation of an inequality sign is highly useful as a teaching aid.

One of the problems of teaching inequality-relationships lies in the child's difficulty in visualizing how negative numbers affect the inequality. If children's only contact with the minus-sign lies in doing subtraction operations, the children can often get by without really knowing what they are doing, just by following rote-learned rules. Often, the reason the inequalities concept appears so difficult for a child to learn is that it is much more difficult for the child to get by, by rote-learning the rules affecting manipulation of inequalities.

Indeed, it may be stated that if children have difficulty with the manipulation of inequalities, that fact in itself might be an indication that the children have learned their number concepts simply by rote, and that they have no real "feel" for arithmetic and numbers. The fact that children appear to perform well at actually doing arithmetic operations is not necessarily proof that the children have properly learned what the basic arithmetical operations really mean. So, often what happens is that children who have not grasped the underlying number concepts, although seemingly fairly good at simple adding and subtracting, have considerable difficulty manipulating inequalities. The concerned teacher, upon finding that children have difficulty with inequalities, will take that as an indication that the children have not grasped basic number concepts properly, especially the concept of negative numbers, and will turn all the more forcefully to the double-beam balance, as described herein, as a teaching aid.

The double-beam balance as shown in FIG. 1 enables children to see the effect of moving the weights (the children quickly come to regard these as either positive weights or negative weights, depending upon which beam the weights are on) and to see the resulting effect on the "inequality sign" formed by the pinions.

The apparatus as shown in FIG. 1 includes a magnet 39. The magnet is mounted for magnetic co-operation with a magnetic member, which in this case is a steel screw 40, carried on the lower pinion 34. The magnet 39 is adjustable as to its height, whereby the magnet can be moved nearer to or further away from the member 40. Thus, the magnitude of the magnetic attraction can be adjusted. The magnet 39 is so positioned as to draw the beam 28 (and with it the upper beam 27) into the arms-horizontal (balanced) condition; the force with which it does so is a maximum when the beam is in the balanced condition. The magnet thus gives the effect of a detent, which acts to hold the beam(s) in the arms-horizontal, indicates-balanced, condition.

The performance of the double-beam math balance, as described herein, is affected by the nature of the equilibrium with which the beams move to, and remain in, the balance position. The magnet can be used to modify the nature of the equilibrium, as will be described.

The apparatus can be designed to be adjustable so that, when the beams are in balance, the balance condition is either in stable equilibrium, neutral equilibrium, or unstable equilibrium. If the equilibrium were to be too stable, a small difference in weight between the left and right arms might cause the beams to settle at, say, two degrees from the horizontal. In an apparatus of the kind described, it is preferable that the apparatus is either clearly in-balance or clearly not-in-balance, and children would have a problem trying to decide whether a beam lying tilted at two degrees was supposed to be in balance or not.

On the other hand, unstable equilibrium in the in-balance condition, in which the beam would accelerate to one end of its permitted range of travel upon the slightest imbalance, is not desirable. Even neutral equilibrium is contra-indicated, in that then the beam would just as easily settle to down-left-five-degrees as to the desired arms-horizontal condition, when in balance. Ideally, what is preferred would be stable equilibrium from the standpoint of urging the arms to the horizontal condition when inbalance, but neutral or unstable equilibrium from the standpoint of good sensitivity-to-imbalance.

The greater the vertical offset distance between the centre of mass of the beam, and the fulcrum of the beam, the more stable the equilibrium of the beam, and the more the beam tends to gravitate to the arms-horizontal condition when in balance. However, the more stable the equilibrium of the beam, the more the beam tends to gravitate to the nearly-horizontal condition even when slightly out of balance. That is to say: the greater the vertical offset distance between the centre of mass of the beam, and the pivot axis of the beam, the more stable the equilibrium of the beam when in the balanced, or nearly balanced condition, and the less sensitive the apparatus is to the beams being out of balance.

Indeed, sensitivity to small weight differences is quite important in the apparatus. To be useful as a teaching aid, the apparatus should quickly settle to the arms-horizontal condition when the beam is balanced, and should quickly tilt to the extreme tilt angle permitted by the stops 35, when the beam is unbalanced, even by just one weight unit placed at the first weight station on one of the arms.

Preferably, the apparatus should be set so that a condition of just-stable equilibrium obtains, when the beam is in balance. The more carefully the apparatus is engineered, the closer the apparatus can be placed to the position of neutral equilibrium. The purpose of the magnet 39 is to allow this compromise over the equilibrium stability to be eased. The magnet enables the apparatus to move quickly and surely to the indicates-balanced condition when the beams are in balance, and enables the apparatus to move quickly and surely to the indicates-not-balanced condition when the beams are in the out-of-balance-by-one condition.

The provision of the magnet in the apparatus permits the apparatus to function properly, and yet to be manufactured and adjusted to less stringent standards of precision and accuracy.

In setting the apparatus up, the beams are first brought into exact balance by adjusting the positions of the screw 42 on the end of the right arm of the beam 27 (FIG. 3). (A similar screw 42a, to act as a counterbalance, is provided on the left arm.) Next, the height of the centre of mass of the upper beam unit is adjusted, to set its relationship to the height of the axis of the upper fulcrum 25. This is done by adjusting the height of the movable screw 43 on the pinion 32.

Corresponding adjustments are carried out for the lower beam unit (i.e adjustments for left-right balance of the lower beam unit, and for adjusting the height of the centre of mass of the lower beam unit to the desired relationship to the lower fulcrum axis).

It is important that the axes of the fulcrums 25,26 be in exact vertical alignment, and the designer might additionally provide a means for adjusting that alignment. For example, in an alternative construction, the post is supported on adjustable set screws, arranged in a triangle.

The vertical offset distance (i.e the vertical distance between the centre of mass and the axis of pivoting at the fulcrum) is adjusted, for both beams, so as to strike the best compromise between the beams quickly settling to the arms-horizontal position when in the in-balance condition, and quickly settling to the maximum-tilted position when in the out-of-balance-by-one condition.

The magnet 39 assists in striking the best compromise. The presence of the magnet allows the apparatus to operate properly even though the vertical offsets are so small that the beams, although in stable equilibrium, are close to the neutral equilibrium condition. When the beam is in balance, the magnet draws the beam to the arms-horizontal condition, which is advantageous in case any small errors of manufacture or set-up might tend to make the beams settle at a small angle down from the horizontal. The magnetic attraction is set, by adjusting the height of the magnet, until the magnetic pull is enough to draw the beam to the centre when in balance, but not enough to draw the beam to the centre when in the out-of-balance-by-one condition.

For neutral equilibrium, the vertical offset distance between the centre of mass of the beam, and the pivot axis of the beam, is set to zero. With the benefit provided by the magnet, in fact, the screw 43 can even be set so that the beam units are in a condition of slightly un-stable equilibrium (i.e the vertical offset distance between the centre of mass of the beam, and the fulcrum of the beam, is slightly negative—or, the centre of mass is slightly above the fulcrum). The unstable condition can be utilised because the magnet applies a force tending to hold the beams in the arms-horizontal position, which is sufficient to hold the beam, provided the beam is in balance. Thus, the magnet enables the ideal of stability-with-sensitivity to be more readily achieved.

This degree of extra sensitivity that can be realised with the magnet is advantageous also because it permits the weights to be smaller. The 1-cm-1-gm cubes that are common in classrooms are rather too light for a classroom balance beam to measure reliably, unless the apparatus is manufactured to stringent engineering standards, which is expensive, and not very practical in a classroom. Also, the weights themselves are subject to manufacturing inaccuracies. The use of the magnet permits the 1-cm-1-gm cubes to be used, and yet permits the apparatus to be manufactured to more ordinary standards.

Positioning the screws 43 so that the centre of mass is above the pivot axis puts the beam in a condition of unstable equilibrium; and as mentioned it might be advantageous to set, the apparatus to this condition. This condition is tenable when a magnet is provided, even though, in the unstable equilibrium condition, the beams do not tend to self-align themselves horizontally; the magnet holds the beams in balance, provided they are in-balance and provided the child moves the beams to the beamshorizontal condition.

At the weight-stations 36, as mentioned, the weights 37,38 are attached by means of a peg-in-socket arrangement. The weight is attached in such a way that the line of action of the weight passes through the point of suspension. That is to say, the point of suspension lies on the centre of mass of the weight. Preferably, the weight-stations should be in horizontal alignment with the fulcrum, when the beam is horizontal, so that the weights are neutral as to their effect on the stability of the equilibrium of the balance condition.

FIG. 4 shows an alternative embodiment, which performs in the same manner as the version shown in FIG. 1. It may be noted that the levers 45,46 indicate the inequality sign ">" or "<" just as did the pinions in the FIG. 1 structure.

FIGS. 5 and 6 show two further embodiments. Here, the two beams lie one-behind-theother, on a common horizontal axis. The interconnecting levers or pinions between the beams causes the beams to tip one clockwise, the other equally anti-clockwise, when out of balance. The arrangement of FIGS. 5 and 6 is advantageous in that when children view the apparatus from in front, the children see the positive and negative weights moving further apart as the difference between them grows larger, and that is good. However, in FIGS. 5 and 6 there is nothing that indicates the inequality sign, which was such an advantageous feature of FIGS. 1 and 4.

The invention provides the second beam, which represents the negative numbers. The second beam enables children to visualize the notion of negative numbers as a set of numbers parallel to the set of positive numbers.

The difference between the notion of subtracting a number, and the notion of seeing a negative number as one of a series of negative numbers, can be demonstrated by the use of the second beam.

Of course, many combinations of weights and positions will cause balance or imbalance. Children will find such explorations most interesting, and highly educational, especially if done under the guidance of a suitably-trained teacher.

Children will quickly learn to draw the correct parallels, i.e to understand the equivalence, between the simple addition-equations that can be carried out using just one beam, and the negative-equations that can be carried out using both beams. Children will see how the two operations interact with, and complement, each other.

It may be regarded that the pivot or fulcrum represents an equality sign in an equation (or, as mentioned above, in some cases, an inequality sign). The left arms of the beams represent the left side of the equation, positive numbers above, and negative numbers below. Equally, the right arms of the beams represent the right side of the equation, positive numbers above, and negative numbers below.

Figure 9:
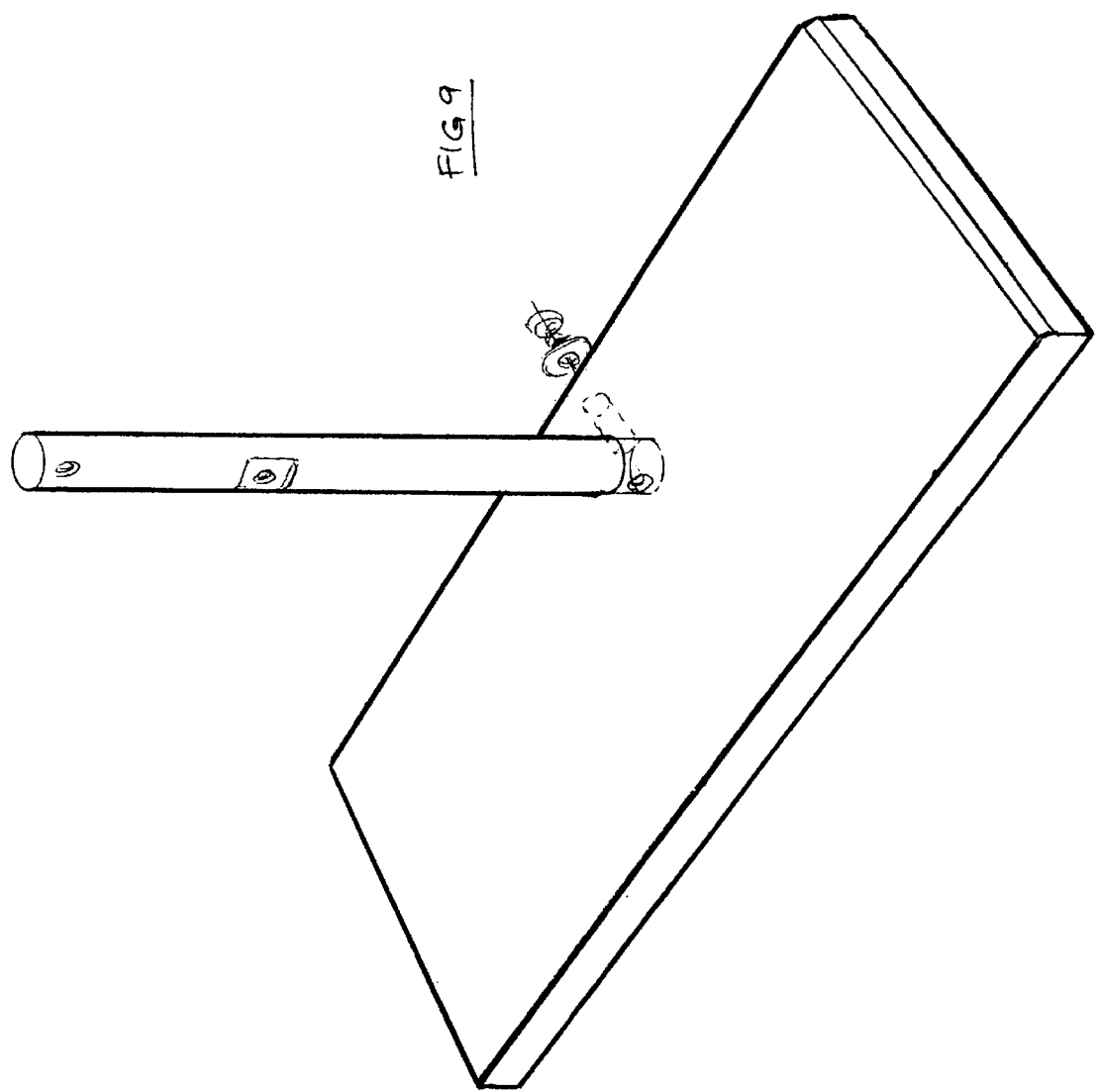
Figure 10:
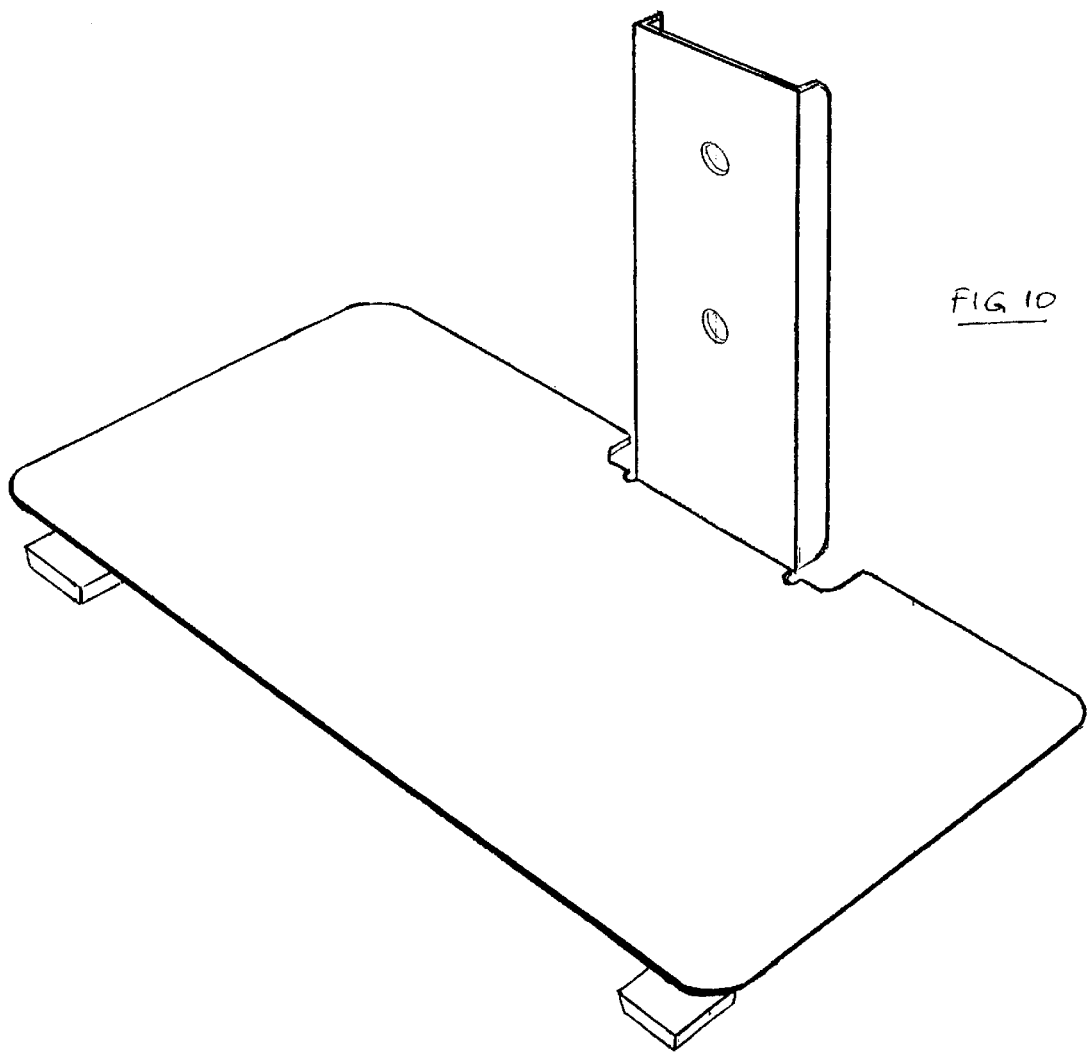

Some alternative constructional details are shown in FIGS. 9–11. In FIG. 9, the base or fixed frame is formed as a plastic block; the upright post is a rod of aluminum, in which are machined suitable holes, flats, etc, as shown. In FIG. 10, the upright post and base plate are combined in a single unit, which is pressed and punched in sheet metal. FIG. 11 shows the beam made from an aluminum extrusion.

In the above drawings, the double-beam balance apparatus is presented as being of a size that will fit on a table or desk. However, the double-beam balance can also be made larger, i.e large enough to be provided with seats. The children themselves can then serve as the weights, and can cause the apparatus to balance by positioning themselves at appropriate locations on the beams. Thus, the apparatus becomes a see-saw. (This mode of construction and operation is described in WO-95/32778 in relation to a single-beam balance.) See-saw operation is applicable to the beams layouts as in FIGS. 5 and 6. The FIG. 1 layout would be less suitable for the see-saw mode.

It should be noted that the ball bearing 29 is preferred over a knife-edge type of bearing (which might be considered in the context of a beam balance). In the double-beam balance, as described herein, it is possible to create an in-balance condition by placing weights only on the right arms, or only on the left arms, of the beams. In that case, a side-load is applied to the bearing. A knife-edge type of bearing cannot support a substantial side-load, whereas a ball-bearing can.

What is claimed is:

1. Educational apparatus, comprising a double-beam math balance, wherein:

the apparatus includes a first balance beam, pivoted about a first fulcrum, and a second balance beam pivoted about a second fulcrum;

in respect of each balance beam, the beam has left and right arms, extending radially from the fulcrum;

in respect of each balance beam, the beam includes many weight-stations, each weight-station having a means, at the weight-station, for applying a weight to the bar;

in respect of each balance beam, the weight-stations are disposed in a series along the length of the beam;

the beam is marked with numerals in respect of the weight stations, each numeral being ascribed to a respective one of the weight stations;

the numerals are so marked as to be readily visible to a user of the apparatus;

in respect of each balance beam, and in respect of each numeral, the numeral is ascribed to its respective weight-station in proportional correspondence to the radial distance of that weight station from the fulcrum of that beam;

in respect of each balance beam, the fulcrum of that beam includes a means for constraining the beam against all modes of movement other than pivoting about the axis of the fulcrum;

the fulcrums are so mounted in a frame of the apparatus that the axis of the first fulcrum and the axis of the second fulcrum are both horizontal;

the apparatus includes a beam-interconnecting-means, for interconnecting the first and second balance beams;

the beam-interconnecting-means is such as to constrain the first and second beams to move pivotally about their respective fulcrums only in unison with each other, in that, upon the first balance beam undergoing an angular movement about the first fulcrum, the beam-interconnecting-means constrains the second balance beam to undergo a corresponding angular movement about the second fulcrum, and upon the second balance beam undergoing an angular movement about the second fulcrum, the beam-interconnecting-means constrains the first balance beam to undergo a corresponding angular movement about the first fulcrum;

the beam-interconnecting-means is so arranged as to constrain the two beams, when they undergo tilting movement, to tilt one clockwise and the other correspondingly anti-clockwise, about their respective fulcrums;

and the arrangement of the beam-interconnecting-means is such that, in respect of an angular movement of amplitude X degrees undergone by the first beam, during operation, the corresponding angular movement undergone by the second beam is a multiple of X degrees, and the multiple remains the same throughout the range of the angular movement.

2. Apparatus of claim 1, wherein:

in respect of each balance beam, the beam has an arms-horizontal position, in which the beam is balanced and can be seen to be so;

the arrangement of the apparatus is such that the beam has a permitted range of angular movement about the fulcrum away from the balanced position;

and the beam has an indicates-not-balanced position, in which the beam is not balanced and can be seen to be so, at an extremity of the range.

3. Apparatus of claim 2, wherein the apparatus includes stop means, for limiting the angular movement of the beams beyond the permitted range.

4. Apparatus of claim 2, wherein the apparatus is of such a nature as to be suitable to be sat upon by children, whereby the apparatus comprises a double-beam see-saw.

5. Apparatus of claim 1, wherein the said multiple is unity, in that the beam-interconnecting-means constrains the amplitude of the angular movement of the first beam to be equal to the amplitude of the angular movement of the second beam.

6. Apparatus of claim 2, wherein the beams lie one behind the other, their fulcrums each on the same horizontal pivot axis.

7. Apparatus of claim 2, wherein the axis of the first fulcrum lies vertically directly above the axis of the second fulcrum.

8. Apparatus of claim 7, wherein:

the beam-interconnecting-means includes a first pinion, which is fast with the first beam, and a second pinion, which is fast with the second beam;

the first and second pinions are provided with respective teeth;

and the shapes, dimensions, and arrangement, of the beams, pinions, pivots, and teeth, is such that, during operation, the teeth are in mesh.

9. Apparatus of claim 8, wherein:

the first beam has a first centre of mass thereof, and the apparatus includes means for positioning the first fulcrum above the said first centre of mass, by a distance termed the first beam offset radius;

and the second beam has a second centre of mass thereof, and the apparatus includes means for positioning the second fulcrum above the said second centre of mass, by a distance termed the second beam offset radius.

10. Apparatus of claim 9, wherein the apparatus includes a means for adjusting the height of the centre of mass of at least one of the beam units, to the extent that both beam units can be brought to the same vertical offset radius.

11. Apparatus of claim 2, wherein:
the apparatus includes a magnet-member, and a complementary-member;
the members are mounted one on the frame of the apparatus, and the other on one of the beam units;
the members are so arranged in the apparatus that the point of closest proximity, and of maximum magnetic attraction, between the members, is when the beam is in the balanced, arms-horizontal, condition;
the apparatus is so arranged that the strength of the maximum attraction is enough to draw and retain the beam unit into the arms-horizontal position when the beam is in balance, but is not so strong as to draw and retain the beam unit into the arms-horizontal position when the beam is not in balance.

12. Apparatus of claim 11, wherein the apparatus includes a means for adjusting the members as to their closest separation from each other, such closest separation, and consequent maximum attraction, occurring when the beam unit is in its arms-horizontal position.

13. Apparatus of claim 11, wherein:
the beam-interconnecting-means includes a first pinion, which is fast with the first beam, and a second pinion, which is fast with the second beam;
the first and second pinions are provided with respective teeth;
the shapes, dimensions, and arrangement, of the beams, pinions, pivots, and teeth, is such that, during operation, the teeth are in mesh;
and the vertical offsets of each beam are so small that, without the magnet, the beams, when balanced, would be in substantially neutral equilibrium.

14. Apparatus of claim 11, wherein:
the beam-interconnecting-means includes a first pinion, which is fast with the first beam, and a second pinion, which is fast with the second beam;
the first and second pinions are provided with respective teeth;
and the shapes, dimensions, and arrangement, of the beams, pinions, pivots, and teeth, is such that, during operation, the teeth are in mesh;

the vertical offsets of each beam are negative, whereby the beam, when balanced, is in unstable equilibrium;
and the magnetic attraction, at the point of maximum magnetic attraction, is strong enough to hold the beam in the arms-horizontal condition when balanced, but not when not balanced.

15. Apparatus of claim 1, in combination with a set of equal weights, wherein the weights in the set are all equal in weight, and the weights include means for applying the weights to the weight-stations.

16. Apparatus of claim 15, in combination with a set of progressive weights, which includes weights that are progressive integer-multiples of the weight of the weights in the set of equal weights.

17. Apparatus of claim 2, wherein:
in respect of each weight-station, the weight-station includes a weight-application-point, being the point on the respective beam through which the line of action of the weight passes, at all angular positions of the beam;
the arrangement of the weight-stations on the beam is such that all the weight-attachment-points on the beam are in horizontal alignment with the fulcrum of the beam when the beam is in the arms-horizontal position;
whereby the vertical offset distance, being the distance between the centre of mass of the beam unit and the beam's fulcrum, remains constant irrespective of how many weights are placed on the beam.

18. Apparatus of claim 7, wherein the first and second beam units include respective vertical bars;
the apparatus is so arranged that, when the beams are in balance, the bars present an appearance of being vertically in-line;
and that, when the beams are not in balance, the bars present an appearance of an arrow-pointer, having a point directed towards the left when the left arms of the beams carry weights that have a less positive effect on the balance than weights on the right arms of the beams;
and that, when the beams are not in balance, the bars present an appearance of an arrow-pointer, having a point directed towards the right when the right arms of the beams carry weights that have a less positive effect on the balance than weights on the left arms of the beams.

19. Apparatus of claim 2, wherein the apparatus is of such a nature as to be suitable to be sat upon by children, whereby the apparatus comprises a double-beam see-saw.

* * * * *